United States Patent
Richardson

(10) Patent No.: US 8,085,886 B2
(45) Date of Patent: Dec. 27, 2011

(54) SUPRESSION OF UNWANTED SIGNAL ELEMENTS BY SINUSOIDAL AMPLITUDE WINDOWING

(75) Inventor: Michael Richard Richardson, Romsey (GB)

(73) Assignee: BAE Systems plc, London (GB)

(*) Notice: Subject to any disclaimer, the term of this patent is extended or adjusted under 35 U.S.C. 154(b) by 804 days.

(21) Appl. No.: 10/521,745

(22) PCT Filed: Nov. 19, 2004

(86) PCT No.: PCT/GB2004/004921
§ 371 (c)(1),
(2), (4) Date: Jan. 19, 2005

(87) PCT Pub. No.: WO2005/053175
PCT Pub. Date: Jun. 9, 2005

(65) Prior Publication Data
US 2005/0262178 A1 Nov. 24, 2005

(30) Foreign Application Priority Data

Nov. 21, 2003 (GB) .................................. 0327041.0

(51) Int. Cl.
*H03D 1/00* (2006.01)
(52) U.S. Cl. ........ 375/346; 375/316; 375/285; 327/310; 348/607; 455/296; 455/295; 455/298; 455/501
(58) Field of Classification Search .................. 375/260, 375/355, 347
See application file for complete search history.

(56) References Cited

U.S. PATENT DOCUMENTS

| | | | | |
|---|---|---|---|---|
| 3,754,101 A * | 8/1973 | Daspit et al. | .................. | 370/204 |
| 3,876,945 A * | 4/1975 | Gossel | .......................... | 455/212 |
| 4,706,174 A * | 11/1987 | Schutten et al. | .................. | 363/9 |
| 5,109,417 A * | 4/1992 | Fielder et al. | ................. | 704/205 |
| 5,287,387 A | 2/1994 | Birchler | | |
| 5,442,593 A * | 8/1995 | Woodbury et al. | ............ | 367/135 |
| 5,974,087 A | 10/1999 | Nowara | | |
| 6,556,623 B2 * | 4/2003 | Tzannes et al. | ................ | 375/224 |
| 6,577,686 B1 * | 6/2003 | Koga et al. | ..................... | 375/347 |
| 6,628,735 B1 * | 9/2003 | Belotserkovsky et al. | ... | 375/355 |

(Continued)

FOREIGN PATENT DOCUMENTS

EP 0 893 703 A1 1/1999

(Continued)

OTHER PUBLICATIONS

Padmanabhan, K., Ananthi, S., Vijayarajeswaran, R. "A Practical Approach to Digital Signal Processing." 2001. New Age International (P) Ltd. 156-162.*

(Continued)

*Primary Examiner* — Shuwang Liu
*Assistant Examiner* — Gina McKie
(74) *Attorney, Agent, or Firm* — Scully, Scott, Murphy & Presser, P.C.

(57) ABSTRACT

A method is provided for processing a signal containing regular or quasi-regular elements of unwanted signal. The method establishes timing characteristics of the unwanted signal elements in a portion of the signal. A time domain window function is generated using the established timing characteristics. The generated window function is applied to the signal portion to selectively reduce the amplitude of the unwanted signal elements relative to the amplitude of other elements of the signal.

2 Claims, 3 Drawing Sheets

U.S. PATENT DOCUMENTS

| | | | |
|---|---|---|---|
| 6,909,277 B2 * | 6/2005 | Wild | 324/166 |
| 6,931,292 B1 * | 8/2005 | Brumitt et al. | 700/94 |
| 7,027,424 B1 * | 4/2006 | Horvat et al. | 370/337 |
| 2002/0176480 A1 | 11/2002 | Wheatley, III et al. | |
| 2003/0020653 A1 | 1/2003 | Baugh et al. | |
| 2004/0022175 A1 * | 2/2004 | Bolinth et al. | 370/203 |
| 2004/0085891 A1 * | 5/2004 | Henriksson | 370/203 |
| 2004/0161027 A1 * | 8/2004 | Ferguson | 375/224 |
| 2005/0073947 A1 * | 4/2005 | Dey et al. | 370/208 |

FOREIGN PATENT DOCUMENTS

| | | |
|---|---|---|
| EP | 1 069 693 A2 | 1/2001 |

OTHER PUBLICATIONS

Andreas Saul, "Analysis of Peak Reduction in OFDM Systems Based on Recursive Clipping", Proc. Of Int. OFDM-Workshop, Sep. 24-25, 2003, pp. 308-312, vol. 1, Hamburg Germany.

* cited by examiner

Sample Display Range = 50000, Step No = 0 0.000

Sample Display Range = 50000, Step No = 0 0.000

FFT Display Range = 0->553m
Vert Scale = 10dB/div Horiz Scale = 100Hz/div, Step No = 0

FFT Display Range = 0->553m
Vert Scale = 10dB/div Horiz Scale = 100Hz/div, Step No = 0

SUPRESSION OF UNWANTED SIGNAL ELEMENTS BY SINUSOIDAL AMPLITUDE WINDOWING

FIELD OF THE INVENTION

The present invention relates to a method for processing a signal containing interference and, in particular, to a method for processing a signal containing bursts of regular or quasi-regular interference.

BACKGROUND OF THE INVENTION

In certain types of signal, effects arising from certain types of interference burst contained within the signal cannot be removed entirely unless each of the bursts can be substituted by an accurate estimate of the original signal waveform in the corresponding regions of the signal. This may be possible to an acceptable degree of precision when a wanted signal is strong and not corrupted by noise, but in the case where the wanted signal is weak and not visible above the level of the noise or of other unwanted signals, substitution cannot necessarily be performed. It should also be noted that simple excision of the interference bursts is ineffective since this merely has the effect of replacing one interfering signal with another.

It is increasingly common for signal processing to be carried out digitally in the frequency domain, in modems for example. Certain types of regular or quasi-regular interference burst contained in signals, when processed in the frequency domain, can be particularly disruptive. A common source of such interference is ignition noise generated within motor vehicle engines. However, while the effects of such interference are particularly noticeable in frequency domain signal processing, equivalent degradation may also arise in time domain processing of such signals and the principles of the present invention may also be applied to such applications.

SUMMARY OF THE INVENTION

According to a first aspect of the present invention, there is provided a method for processing a signal containing regular or quasi-regular elements of unwanted signal, the method comprising the steps of:
(i) establishing timing characteristics of the unwanted signal elements in a portion of said signal;
(ii) generating a time domain window function using said established timing characteristics; and
(iii) applying the generated window function to said signal portion to selectively reduce the amplitude of said unwanted signal elements relative to other elements of said signal.

Preferably, the generated time domain window function is a sinusoidal function. In other applications, different window functions may be selected according to the specific requirements of the application.

In a preferred embodiment, the method further comprises the steps of:
(iv) applying a Fourier transform or similar spectral analysis process to the signal output from step (iii); and
(v) applying an algorithm to restore the shape of spectral peaks in the transformed signal to an approximation of their form in the absence of said unwanted signal elements.

One of the advantages of using a sinusoidal windowing function is that although spectral peaks in the transformed signal tend to be split into sub-peaks as a result of the modulation applied by the windowing function, only two sub-peaks are created of equal amplitude are created. It is then a simple task to recombine such peak pairs in frequency and amplitude and restore them to a close approximation of signal spectrum that would have been expected in the absence of the application of the windowing function. Other windowing functions may yield a larger number of sub-peaks or other spectral profiles that would be less easy to restore.

BRIEF DESCRIPTION OF THE DRAWINGS

A preferred embodiment of the present invention will now be described, by way of example only, with reference to the accompanying drawings of which.

DETAILED DESCRIPTION OF THE INVENTION

The steps in operation of a preferred method for processing a signal containing regular or quasi-regular bursts of interference will now be described with reference to FIG. 1. This method may be applied in a variety of signal processing applications, particularly when processing in the frequency domain where this type of regular interference burst can tend to mask weaker signals during certain stages in the processing of the signal, especially by creating a "fence" of sidelobe peaks across the entire frequency spectrum of the signal.

Figure 1:
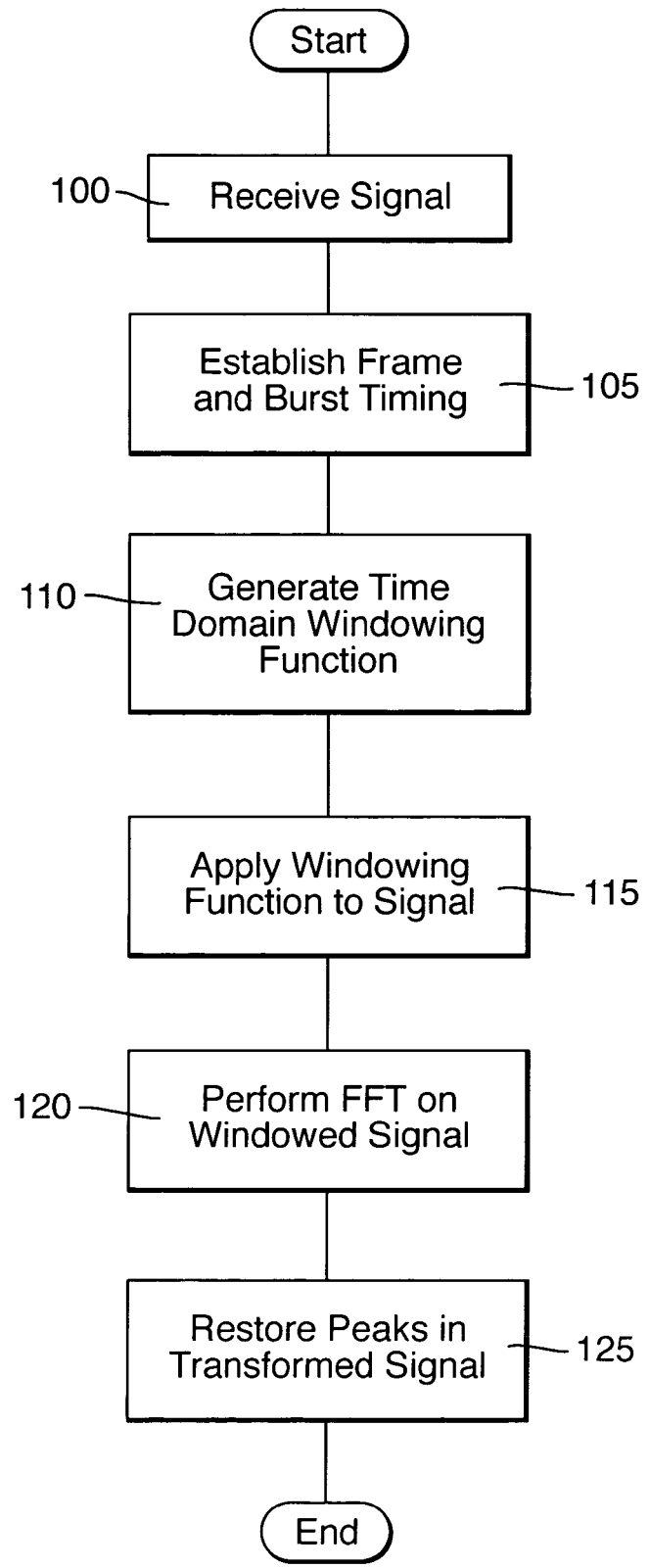
FIG. 1 is a flow diagram showing the steps in a signal interference reduction process according to a preferred embodiment of the present invention.
Figure 2:
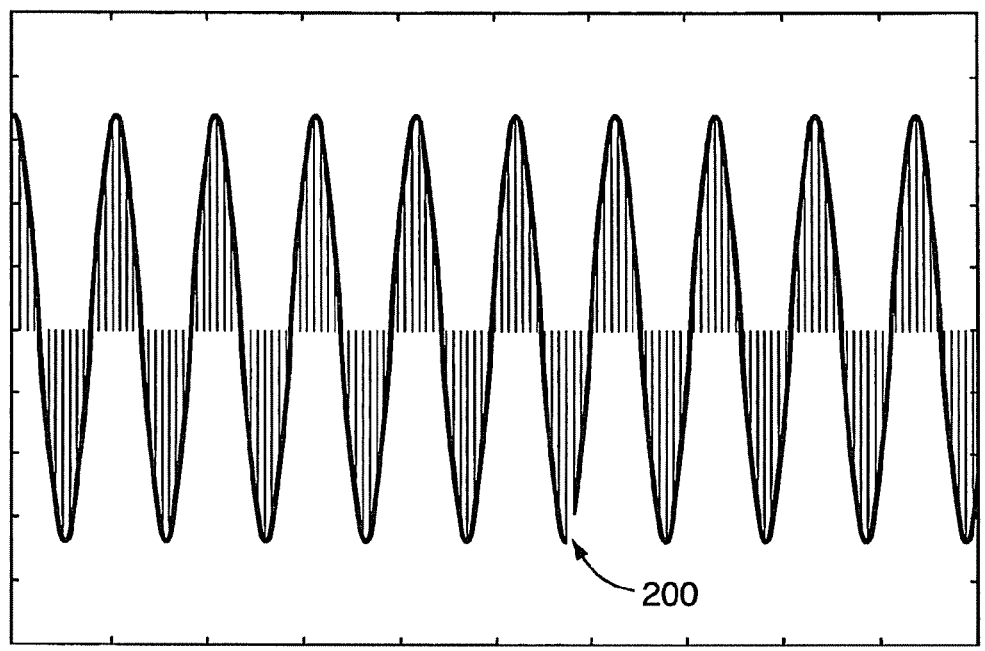
FIG. 2 is a representation of a portion of a test signal containing one burst of interference.

Referring to FIG. 1, at STEP 100, a signal to be processed is received. An example of a portion of a signal of interest is shown in FIG. 2 in which an interference burst can be seen to manifest itself as a notch 200 in the signal envelope. Having received the signal, or at least a portion of it, the first task, at STEP 105, is to establish the locations of the interference bursts contained in the received signal. It may be that the source of interference is unknown and hence the only information available on the timing of the interference bursts is that derivable from an analysis of the signal. However, if the interference source is known, then a certain amount of such information may be extracted from a knowledge of the source. For example, in mobile communications systems such one conforming to the Global System for Mobile (GSM) standards, while signals generally comprise modulated sequences of symbols with a pseudo-random structure, at predefined intervals bursts of signal may be inserted for particular purposes such as frequency correction or synchronisation. Such bursts may not contain sequences of symbols with the pseudo-random properties encountered in the majority of the signal. If the signal is being processed using, for example correlation techniques, which depend for their effectiveness on the general pseudo-randomness of the symbol stream, the occurrence of such bursts can generate interference effects of the type addressed by this invention. However, the structure and formatting of such interference-generating signal bursts are defined in the signal standards and well known procedures exist for the location of such bursts in received signals of this type.

Having established the locations of the interference bursts in the received signal, the next step, STEP 110, is to generate a time domain window function based upon the timing information established at STEP 105. Once generated, the purpose of this window function is to effect a preferential reduction in the amplitude of the received signal in the regions of the interference bursts. Preferably, a sinusoidal window function is generated having zero crossings arranged to coincide with the mid-points of the interference bursts. However, other types of window function may be used as would be apparent to a person of ordinary skill in the field of signal processing.

Figure 3:
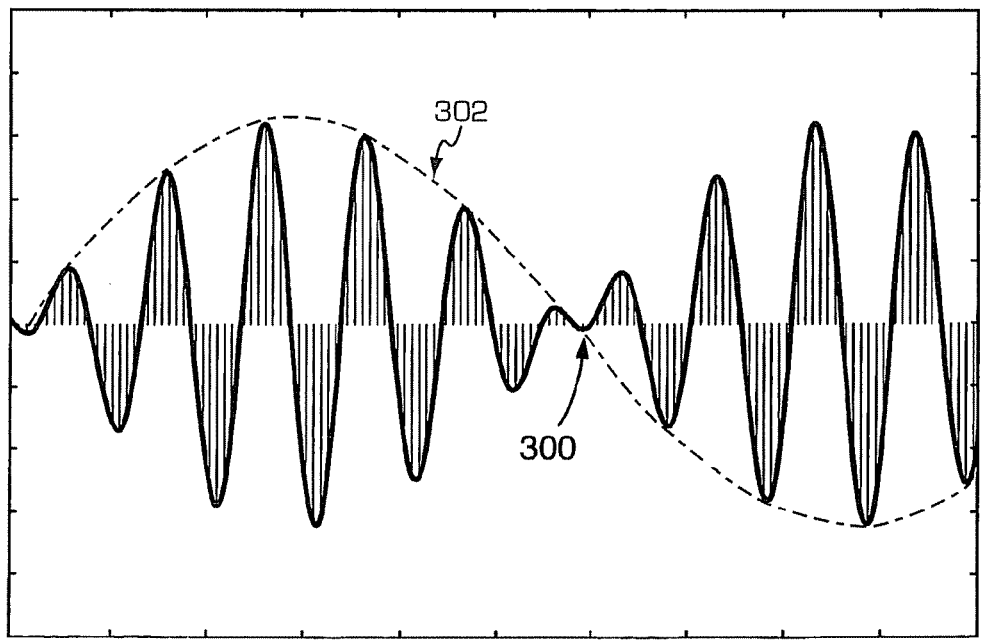
FIG. 3 is a representation of the signal of FIG. 2 following application of a windowing function generated according to a preferred embodiment of the present invention.

Having generated an appropriate window function at STEP 110 for at least a portion of the received signal then, at STEP 115, the window function is aligned with and applied to the received signal, essentially by multiplication of signal by the window function. In the case of the example signal shown in FIG. 2, the result of applying a sinusoidal window function 302, shown as a dotted line, to that signal is shown in FIG. 3. Referring to FIG. 3, it can be seen that the received signal has taken on a sinusoidal amplitude weighting in which the region of signal having the interference burst 200 has been reduced in amplitude, locally to zero at the centre point of the burst 300. This process is mathematically equivalent to the application of suppressed carrier double sideband amplitude modulation to the signal, and is responsible for the peak splitting effect in the spectra of signals to which such windowing has been applied.

Figure 4:
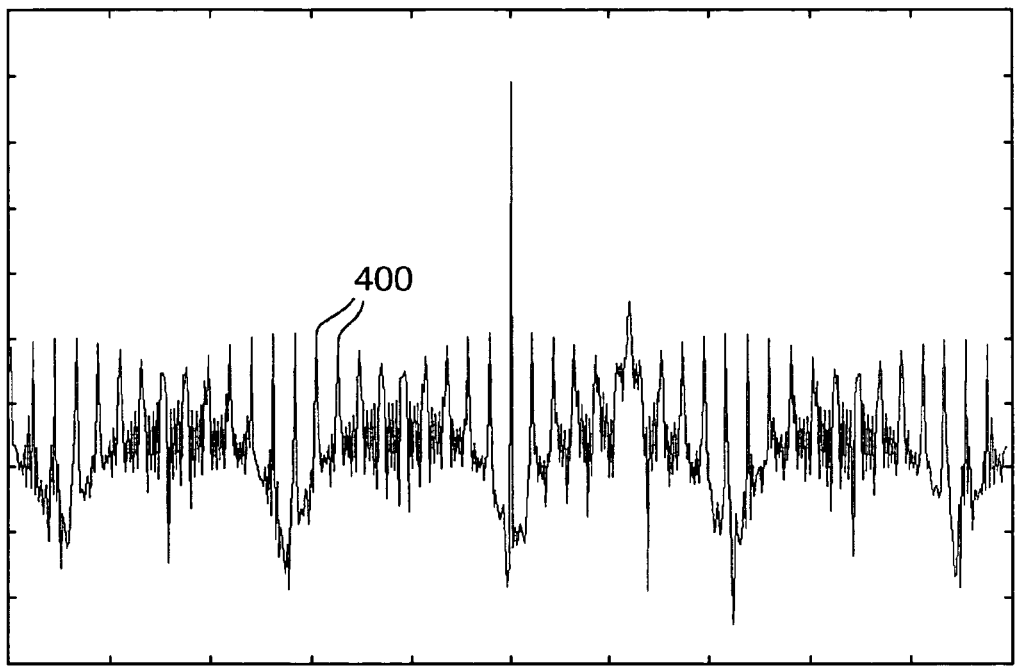
FIG. 4 is a representation of a received signal portion following application of a fast Fourier transform.
Figure 5:
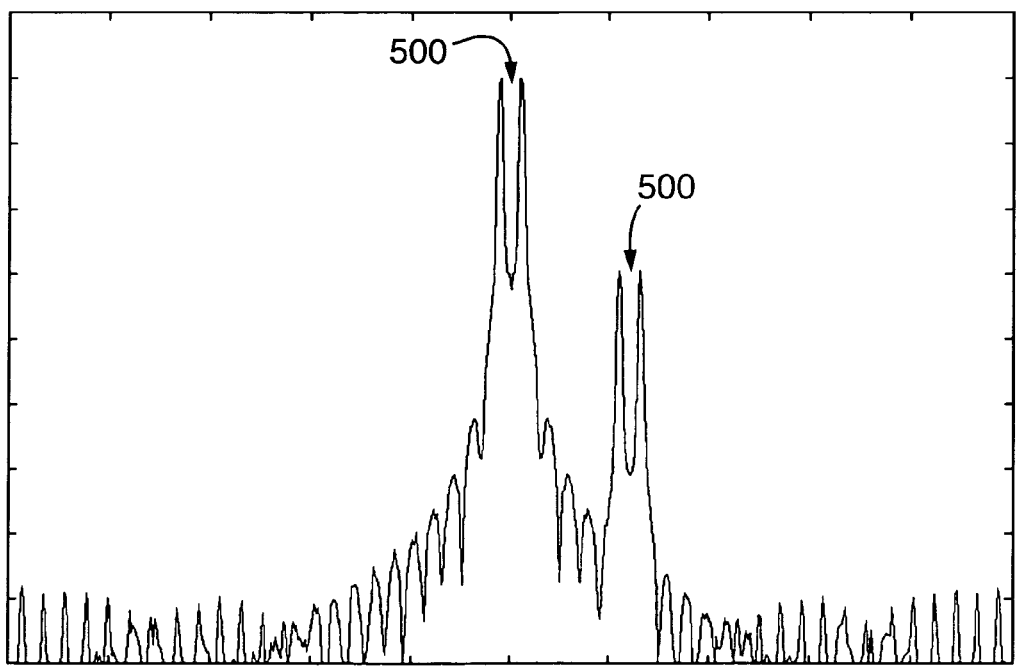
FIG. 5 is a representation of the result of applying an FFT to the same signal as used to generate FIG. 2, but to which a windowing function, generated according to preferred embodiments of the present invention, has been applied prior to application of the FFT.

If, in processing a received signal in the frequency domain, a fast Fourier transform (FFT) or similar spectral analysis process were to be applied to the signal as received, then regular interference bursts would tend to result in a transformed signal comprising a "fence-like" series of spikes with a frequency spacing corresponding to the repetition rate of the interference bursts in the time domain. In some cases such spikes can tend to mask the underlying signals. An example of the result of applying an FFT to a portion of received signal containing a regular interference burst is shown in FIG. 4. As can be seen, the spikes 400 generated as a result of transforming the interference bursts are particularly noticeable. However, if a windowing function is generated and applied as described above with reference to steps 110 and 115 of FIG. 1, to the signal portion of FIG. 4, the result of applying the FFT to the resultant windowed signal is shown in FIG. 5. Referring to FIG. 5, it can be seen that the effect of the interference bursts has been greatly reduced. However, peaks in the transformed signal have tended to split into two sub-peaks, 500. This characteristic arises specifically from the application of a sinusoidal windowing function. However, is it a relatively easy task to recombine associated peak pairs in frequency and amplitude within the transformed signal when the peak as intended has been split into only two sub-peaks, and the spectral splitting characteristics are a simple function of the repetition rate of the interference bursts. This is an advantage of using the preferred sinusoidal windowing function.

Referring again to FIG. 1, at STEP 120 a fast Fourier transform (FFT) is applied to the resultant signal from STEP 115. If, as discussed above in the example of FIGS. 4 and 5, peaks in the transformed signal have been split into two sub-peaks, then at STEP 125, a simple algorithm may be executed to restore the peaks to an approximation of their original form, for example through the use of standard modulation theory for the analysis of the effect of applying a defined amplitude weighting to a signal and knowledge of the frequency of that signal, obtained from the known repetition rate of the interference bursts on the original signal.

It will be appreciated that the invention has been described by way of example only and that variation to the above described embodiments may be made without departing form the scope of the invention.

What is claimed is:

1. A method for digitally processing a received signal containing regular bursts of unwanted signal within the received signal, the method comprising the steps of:
   (i) establishing timing characteristics of the regular bursts of unwanted signal to establish their positions in a portion of said received signal;
   (ii) generating a time domain sinusoidal function using said established timing characteristics, said time domain sinusoidal function having a zero crossing coinciding with the position of each of the regular bursts of unwanted signal; and
   (iii) applying the time domain generated sinusoidal function to said signal portion to selectively reduce the amplitude of said regular bursts of unwanted signal relative to other elements of said received signal in an output signal.

2. A method according to claim 1, further comprising the steps of:
   (iv) applying a Fourier transform to the output signal to provide a transformed signal; and
   (v) applying an algorithm to restore a shape of peaks in the transformed signal to an approximation of their form in absence of said regular bursts of unwanted signal.

\* \* \* \* \*